US012616997B2

(12) United States Patent
Wan et al.

(10) Patent No.: US 12,616,997 B2
(45) Date of Patent: May 5, 2026

(54) ELECTRONIC DEVICE INCLUDING A TRANSDUCER ELECTRICALLY CONNECTED TO A DEMULTIPLEXER AND METHOD FOR FABRICATING THE TRANSDUCER IN THE ELECTRONIC DEVICE

(71) Applicant: InnoLux Corporation, Miao-Li County (TW)

(72) Inventors: Wei-Lin Wan, Miao-Li County (TW); Yu-Tsung Liu, Miao-Li County (TW); Hui-Ching Yang, Miao-Li County (TW); Te-Yu Lee, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 1182 days.

(21) Appl. No.: 17/546,209

(22) Filed: Dec. 9, 2021

(65) Prior Publication Data

US 2022/0234075 A1 Jul. 28, 2022

(30) Foreign Application Priority Data

Jan. 25, 2021 (CN) ........................ 202110095049.X

(51) Int. Cl.
*B06B 1/02* (2006.01)

(52) U.S. Cl.
CPC ........ *B06B 1/0207* (2013.01); *B06B 2201/51* (2013.01); *B06B 2201/55* (2013.01)

(58) Field of Classification Search
CPC .............. B06B 1/0207; B06B 2201/51; B06B 2201/55

(Continued)

(56) References Cited

U.S. PATENT DOCUMENTS 4,656,621 A * 4/1987 Cooperman ........ G11C 11/4096 370/384
10,478,858 B2 11/2019 Lasiter et al.

(Continued)

FOREIGN PATENT DOCUMENTS

CN 105980968 A 9/2016
CN 109068245 A 12/2018

(Continued)

OTHER PUBLICATIONS

Chinese language office action dated Mar. 19, 2024, issued in application No. CN 202110095049.X.

(Continued)

*Primary Examiner* — Emily P Pham
*Assistant Examiner* — Monica Mata
(74) *Attorney, Agent, or Firm* — McClure, Qualey & Rodack, LLP

(57) ABSTRACT

An electronic device is provided. The electronic device includes multiple transducer pixels. Each of the transducer pixels includes a sonic transducer, a demultiplexer electrically connected to the sonic transducer, a driving line electrically connected to the sonic transducer, a switching line electrically connected to the demultiplexer, and a reading line electrically connected to the demultiplexer. The driving line is used to provide a driving signal to the sonic transducer to emit sonic waves. The switching line is used to turn on the demultiplexer to output the sensing signal received by the sonic transducer to the reading line.

7 Claims, 10 Drawing Sheets

(58) Field of Classification Search
USPC ..................................................... 310/316.01
See application file for complete search history.

(56) References Cited

U.S. PATENT DOCUMENTS

| | | | |
|---|---|---|---|
| 10,497,748 B2 | 12/2019 | Panchawagh et al. | |
| 11,659,338 B2 | 5/2023 | Han et al. | |
| 2015/0165479 A1 | 6/2015 | Lasiter et al. | |
| 2016/0071463 A1 | 3/2016 | Takahashi et al. | |
| 2017/0252777 A1 | 9/2017 | Kidwell, Jr. et al. | |
| 2018/0080839 A1 | 3/2018 | Taghibakhsh | |
| 2018/0107854 A1 | 4/2018 | Tsai et al. | |
| 2018/0198056 A1* | 7/2018 | Kim | G10K 11/18 |
| 2018/0341347 A1* | 11/2018 | Yousefpor | G06F 3/043 |
| 2018/0367921 A1* | 12/2018 | Murarka | H04R 25/505 |

FOREIGN PATENT DOCUMENTS

| | | |
|---|---|---|
| EP | 3 362 943 A1 | 8/2018 |
| EP | 3 723 287 A1 | 10/2020 |
| WO | 2017/066612 A1 | 4/2017 |

OTHER PUBLICATIONS

Extended European Search Report dated May 30, 2022, issued in application No. EP 21216757.1.

* cited by examiner

ELECTRONIC DEVICE INCLUDING A TRANSDUCER ELECTRICALLY CONNECTED TO A DEMULTIPLEXER AND METHOD FOR FABRICATING THE TRANSDUCER IN THE ELECTRONIC DEVICE

CROSS REFERENCE TO RELATED APPLICATIONS

This application claims priority of China Patent Application No. 202110095049.X, filed on Jan. 25, 2021, the entirety of which is incorporated by reference herein.

BACKGROUND

Technical Field

The present disclosure relates to an electronic device, and in particular it relates to a sonic transducer and a method for fabricating the same.

Description of the Related Art

The core component of the sonic-wave sensing system is, for example, a micromachined ultrasonic transducer (MUT), which is currently one of the focuses of active development in the industry. So far, most MUTs are based on passive matrices and are fabricated on wafers. Three-dimensional array images cannot be realized. The MUT and external circuits need to be integrated by wafer bonding, which is costly and difficult to fabricate a large-area MUT. Therefore, how to reduce costs and/or realize large-area production is what the industry expects.

SUMMARY

In accordance with one embodiment of the present disclosure, an electronic device is provided. The electronic device includes multiple transducer pixels. Each transducer pixel includes a sonic transducer, a demultiplexer electrically connected to the sonic transducer, a driving line electrically connected to the sonic transducer, a switching line electrically connected to the demultiplexer, and a reading line electrically connected to the demultiplexer. The driving line is used to provide a driving signal to the sonic transducer to emit sonic waves. The switching line is used to turn on the demultiplexer to output the sensing signal received by the sonic transducer to the reading line.

In accordance with one embodiment of the present disclosure, a method for fabricating a sonic transducer is provided. The fabrication method includes providing a substrate, forming a driving layer on the substrate, forming a sacrificial layer on the driving layer, forming a piezoelectric layer on the sacrificial layer, and etching the sacrificial layer, wherein the step of etching the sacrificial layer is performed before forming the piezoelectric layer.

In accordance with one embodiment of the present disclosure, a method for fabricating a sonic transducer is provided. The fabrication method includes providing a substrate, forming a driving layer on the substrate, forming a lower electrode on the driving layer, forming a sacrificial layer on the lower electrode, forming an upper electrode on the sacrificial layer, and removing the sacrificial layer.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein:

FIG. 2-1 is a circuit diagram in an electronic device in accordance with one embodiment of the present disclosure;

FIG. 2-2 is a circuit diagram in an electronic device in accordance with one embodiment of the present disclosure;

FIG. 3-1 shows a top view of a sonic transducer in accordance with one embodiment of the present disclosure;

FIG. 3-2 shows a schematic cross-sectional view taken along the cross-sectional lines A-A' and B-B' of FIG. 3-1 in accordance with one embodiment of the present disclosure;

FIG. 3-3 shows a schematic cross-sectional view of a method for fabricating a sonic transducer in accordance with one embodiment of the present disclosure;

FIG. 4-1 shows a top view of a sonic transducer in accordance with one embodiment of the present disclosure;

FIG. 4-2 shows a schematic cross-sectional view taken along the cross-sectional lines A-A' and B-B' of FIG. 4-1 in accordance with one embodiment of the present disclosure;

FIG. 4-3 shows a schematic cross-sectional view of a method for fabricating a sonic transducer in accordance with one embodiment of the present disclosure; and FIG. 4-3-2 shows a schematic cross-sectional view of a method for fabricating a sonic transducer in accordance with one embodiment of the present disclosure.

DETAILED DESCRIPTION

Figure 1:
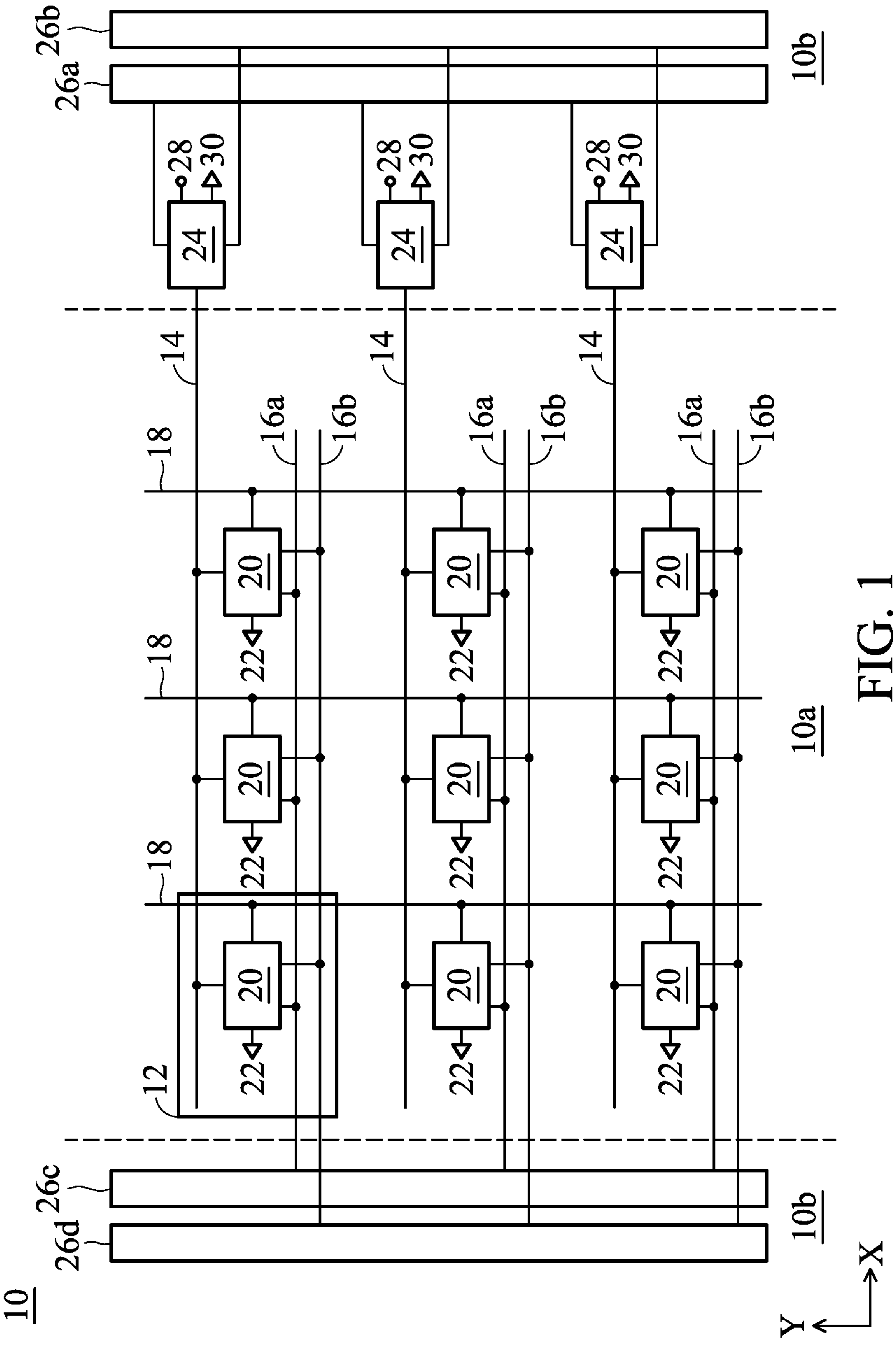
FIG. 1 is a circuit diagram of an electronic device in accordance with one embodiment of the present disclosure.

Various embodiments or examples are provided in the following description to implement different features of the present disclosure. The elements and arrangement described in the following specific examples are merely provided for introducing the present disclosure and serve as examples without limiting the scope of the present disclosure. For example, when a first component is referred to as "on a second component", it may directly contact the second component, or there may be other components in between, and the first component and the second component do not come in direct contact with one another.

In addition, when the terms "comprising", "including" and/or "having" are used in the description of the present disclosure, they specify the corresponding features, regions, steps, operations and/or components, but do not exclude the existence of one or more corresponding features, regions, steps, operations and/or components. When a component such as a layer or region is referred to as being "on" or extending "on" another component (or a variation thereof), it can be directly on the other component or directly extending on the other component, or there can be inserted components between the two.

It should be understood that additional operations may be provided before, during, and/or after the described method. In accordance with some embodiments, some of the stages (or steps) described below may be replaced or omitted.

In this specification, spatial terms may be used, such as "below", "lower", "above", "higher" and similar terms, for briefly describing the relationship between an element relative to another element in the figures. Besides the directions illustrated in the figures, the devices may be used or operated in different directions. When the device is turned to different directions (such as rotated 45 degrees or other directions), the spatially related adjectives used in it will also be interpreted according to the turned position.

It should also be understood that when a component is said to be "coupled" or "connected" to another component (or a variant thereof), it may be directly connected to another component or indirectly connected (e.g., electrically connected) to another component through one or more components.

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section from another element, component, region, layer, portion or section from another element, component, region, layer or section. Thus, a first element, component, region, layer, portion or section discussed below could be termed a second element, component, region, layer, portion or section without departing from the teachings of the present disclosure.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

Referring to FIG. 1, in accordance with one embodiment of the present disclosure, the circuit connection relationship between the components in the electronic device 10 is described. Here, a 3×3 matrix is taken as an example for illustration, but the present disclosure is not limited thereto.

As shown in FIG. 1, the electronic device 10 includes a sensing region 10*a* and a non-sensing region 10*b*, which are arranged adjacent to each other. The sensing region 10*a* includes multiple transducer pixels 12, multiple driving lines 14, multiple switching lines (16*a* and 16*b*) and multiple reading lines 18. In the embodiment, each transducer pixel 12 includes a sonic transducer circuit unit 20, the driving line 14, the switching lines (16*a* and 16*b*) and the reading line 18. The detailed structure and circuit connection relationship of the sonic transducer circuit unit 20 are disclosed in FIGS. 2-1 and 2-2. The non-sensing region 10*b* includes multiple driving circuits (26*a*, 26*b*, 26*c* and 26*d*). The driving circuit 26*a* is electrically connected to a demultiplexer 24 to turn on the demultiplexer 24. Each demultiplexer 24 is electrically connected to the driving line 14 and receives the driving signal 28 and the reference signal 30. In the embodiment, the switching lines (16*a* and 16*b*) are electrically connected to the driving circuits (26*c* and 26*d*), respectively. In other embodiments, the switching lines (16*a* and 16*b*) may be electrically connected to the same driving circuit, but are not limited thereto. The detailed structure and circuit connection relationship of the demultiplexer 24 are disclosed in FIGS. 2-1 and 2-2. In the embodiment, the multiple transducer pixels 12 may respectively correspond to the pixel units of the electronic device (not shown). In other embodiments, the multiple pixel units may also share one transducer pixel 12, but are not limited thereto.

In the present disclosure, the sonic waves may include infrasonic waves, for example, the frequency is less than 20 Hz, acoustic waves, for example, the frequency is between 20 Hz to 20 kHz, and ultrasonic waves, for example, the frequency is higher than 20 kHz.

The electronic device may have a display function. The electronic display device of the disclosed embodiment may include a display device, an antenna device, a sensing device, a splicing device or a transparent display device, but is not limited thereto. The electronic device may be a rollable, stretchable, bendable or flexible electronic device. The electronic device may include, for example, liquid crystal, light-emitting diode (LED), quantum dot (QD), fluorescence, phosphor or other suitable materials which may be combined arbitrarily, or other suitable display media, or a combination thereof. The light-emitting diode may include, for example, an organic light-emitting diode (OLED), a millimeter/submillimeter light-emitting diode (mini LED), a micro light-emitting diode (micro LED) or a quantum dot light-emitting diode (for example, QLED or QDLED), but is not limited thereto. The antenna device may be, for example, a liquid-crystal antenna, but is not limited thereto. The splicing device may be, for example, a display splicing device or an antenna splicing device, but is not limited thereto. It should be noted that the electronic device may be any combination of the aforementioned modes, but is not limited thereto. In addition, the appearance of the electronic device may be rectangular, circular, polygonal, a shape with curved edges or other suitable shapes. The electronic device may have a driving system, a control system, a light source system, a shelf system, and other peripheral systems to support a display device, an antenna device, or a splicing device. Hereinafter, an electronic display device with display function will be used to illustrate the content of the present disclosure, but the present disclosure is not limited thereto.

Figures 1, 2:
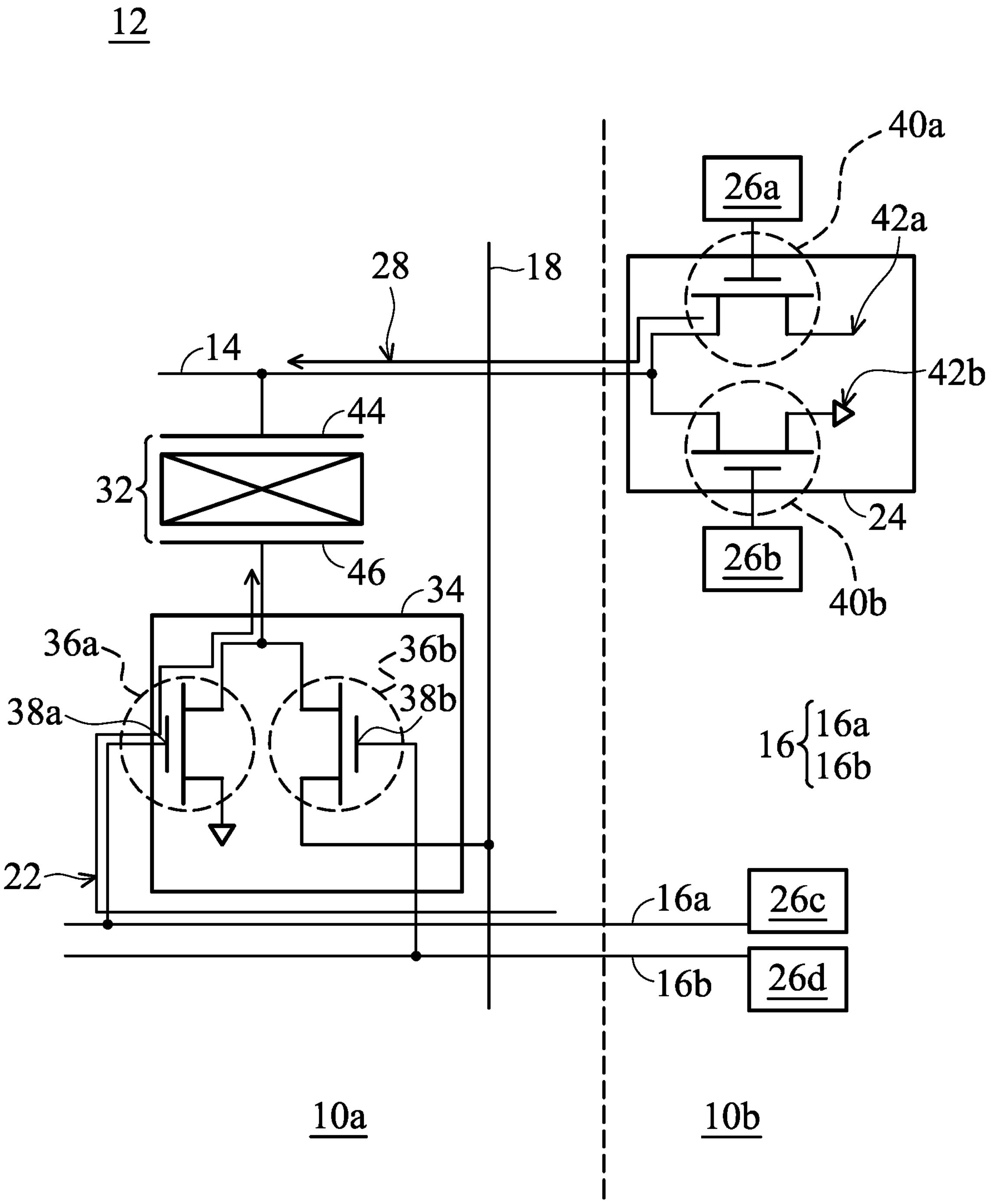
Figure 2:
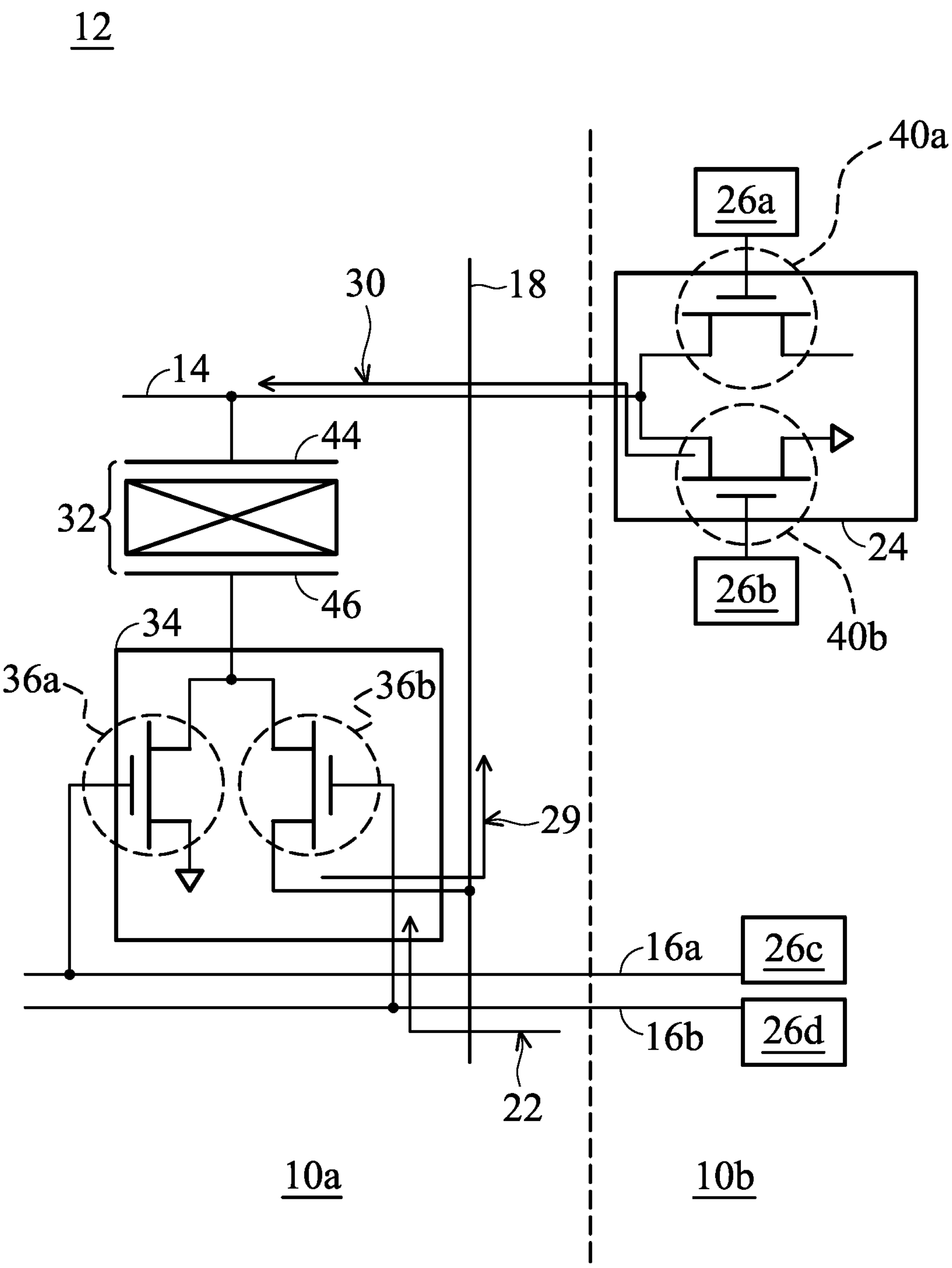

Referring to FIGS. 2-1 and 2-2, in accordance with one embodiment of the present disclosure, the circuit connection relationship among the components in the single transducer pixel 12 and how to transmit and receive signals are further described.

As shown in FIG. 2-1, in the sensing region 10*a*, the sonic transducer circuit unit 20 includes a sonic transducer 32 and a demultiplexer 34. In the embodiment, the demultiplexer 34 and the driving line 14 are electrically connected to the sonic transducer 32. The switching lines (16*a* and 16*b*) and the reading line 18 are electrically connected to the demultiplexer 34. The sonic transducer 32 may include a piezoelectric micromachined ultrasonic transducer (PMUT) or a capacitive micromachined ultrasonic transducer (CMUT), but is not limited thereto. In FIG. 2-1, the demultiplexer 34 is electrically connected to the sonic transducer 32. The driving line 14 is electrically connected to the sonic transducer 32. The driving signal 28 is transmitted to the sonic transducer 32 through the driving line 14, so that the sonic transducer 32 emits sonic waves. The reading line 18 is electrically connected to the demultiplexer 34. The switching lines (16*a* and 16*b*) are electrically connected to the demultiplexer 34 to turn on the demultiplexer 34. In the embodiment, when the electronic device 10 performs different actions, such as signal transmission or signal reception, the switching lines (16*a* and 16*b*) send different signals to make the demultiplexer 34 perform different actions. For example, in FIG. 2-1, the switching line turns on the demultiplexer 34 and sends the reference signal 22 to the sonic transducer 32, or in FIG. 2-2, the switching line turns on the demultiplexer 34 and outputs the sensing signal received by the sonic transducer 32 to the reading line 18. The demultiplexer 34 may include at least two transistors (36*a* and 36*b*), but the present disclosure is not limited thereto. In the embodiment, the demultiplexer 34 includes two transistors (36*a* and 36*b*). The switching line includes two branch lines (16*a* and 16*b*) electrically connected to the gates (38*a* and 38*b*) of the two transistors (36*a* and 36*b*) of the demultiplexer 34, respectively. The non-sensing region 10*b* includes the demultiplexer 24. The demultiplexer 24 may include at least two transistors (40*a* and 40*b*), but the present disclosure is not limited thereto. In the embodiment, the demultiplexer 24 includes two transistors (40*a* and 40*b*). The sources (42*a* and 42*b*) of the transistors (40*a* and 40*b*) of the demultiplexer 24 receive the driving signal 28 and the reference signal 30, respectively. In the present disclosure, the source and drain may be exchanged for each other, but is not limited thereto.

In accordance with FIG. 2-1, it is illustrated how the electronic device 10 of the present disclosure performs signal transmission. When the signal transmission is performed, the driving circuit 26*a* first turns on the transistor 40*a* of the demultiplexer 24, and the driving signal 28 is transmitted to the upper electrode 44 of the sonic transducer 32 through the driving line 14. At this moment, the potential of the driving signal 28 is equal to the potential of the upper electrode 44, and the driving signal 28 is an alternating current (AC) signal. At the same time, the driving circuit 26*c* turns on the transistor 36*a* of the demultiplexer 34 through the switching line 16*a*, and the reference signal 22 is transmitted to the lower electrode 46 of the sonic transducer 32. At this moment, the potential of the reference signal 22 is equal to the potential of the lower electrode 46, and the reference signal 22 is a direct current (DC) signal. Due to the alternating-current (AC) driving potential of the upper electrode 44 and the direct-current (DC) reference potential of the lower electrode 46, the sonic transducer circuit unit 20 sends a signal (for example, a sonic wave) to the object to be measured.

In accordance with FIG. 2-2, it is illustrated how the electronic device 10 of the present disclosure performs signal reception. When the signal reception is performed, the driving circuit 26*b* first turns on the transistor 40*b* of the demultiplexer 24, and the reference signal 30 is transmitted to the upper electrode 44 of the sonic transducer 32 through the driving line 14. At this moment, the potential of the reference signal 30 is equal to the potential of the upper electrode 44, and the reference signal 30 is a direct current (DC) signal, so that the upper electrode 44 maintains at a fixed voltage. At the same time, the driving circuit 26*d* transmits the reference signal 22 and turns on the transistor 36*b* of the demultiplexer 34 through the switching line 16*b*. At this moment, the sonic transducer 32 has converted the sonic-wave signal reflected back from the object to be measured into a corresponding electrical signal 29. The electrical signal (e.g., sensing signal) 29 is outputted to the reading line 18 for reading through the lower electrode 46 and the transistor 36*b* of the demultiplexer 34, so that the electronic device 10 can receive the signal (for example, the returned sonic wave).

In accordance with the actuation mode of the sonic transducer circuit unit 20 for signal transmission and reception as shown in FIGS. 2-1 and 2-2, it can detect, for example, the distance or surface profile of the object to be measured.

In accordance with FIG. 1, different modes of signal transmission and reception can be adopted. For example, the sonic transducer circuit units 20 located in the same transducer pixel or in the same row of transducer pixels are selected to perform signal transmission and reception at the same time. Alternatively, the sonic transducer circuit units 20 located in different rows of transducer pixels are selected to perform signal transmission and reception respectively. For example, the sonic transducer circuit units 20 located in the first row of transducer pixels is selected to perform signal transmission, and the sonic transducer circuit units 20 located in the second row of transducer pixels is selected to perform signal reception, but the present disclosure is not limited thereto. Any selection of transducer pixels combined with signal transmission and reception modes is applicable to the present disclosure.

In addition, the actuation of signal transmission and reception can also be adjusted by the driving circuit, for example, with or without beam-forming mode. When the beam-forming mode is not used, all the transducer pixels emit sonic waves simultaneously, enabling a large-scale and comprehensive detection. In order to detect the object at a specific location and with a specific distance, the beam-forming mode can be used (that is, the signal transmission with phase difference is provided). For example, in the beam-forming mode, the driving signals emitted at different timings can be controlled by the driving circuit, so that, for example, the transducer pixels in the same row emit sonic waves at different timings. The phase-difference signals generated by the time difference produce a superposition effect of constructive interference on the sonic waves emitted by the object at a specific position and with a specific distance, which effectively enhances the signal strength.

Figures 1, 3:
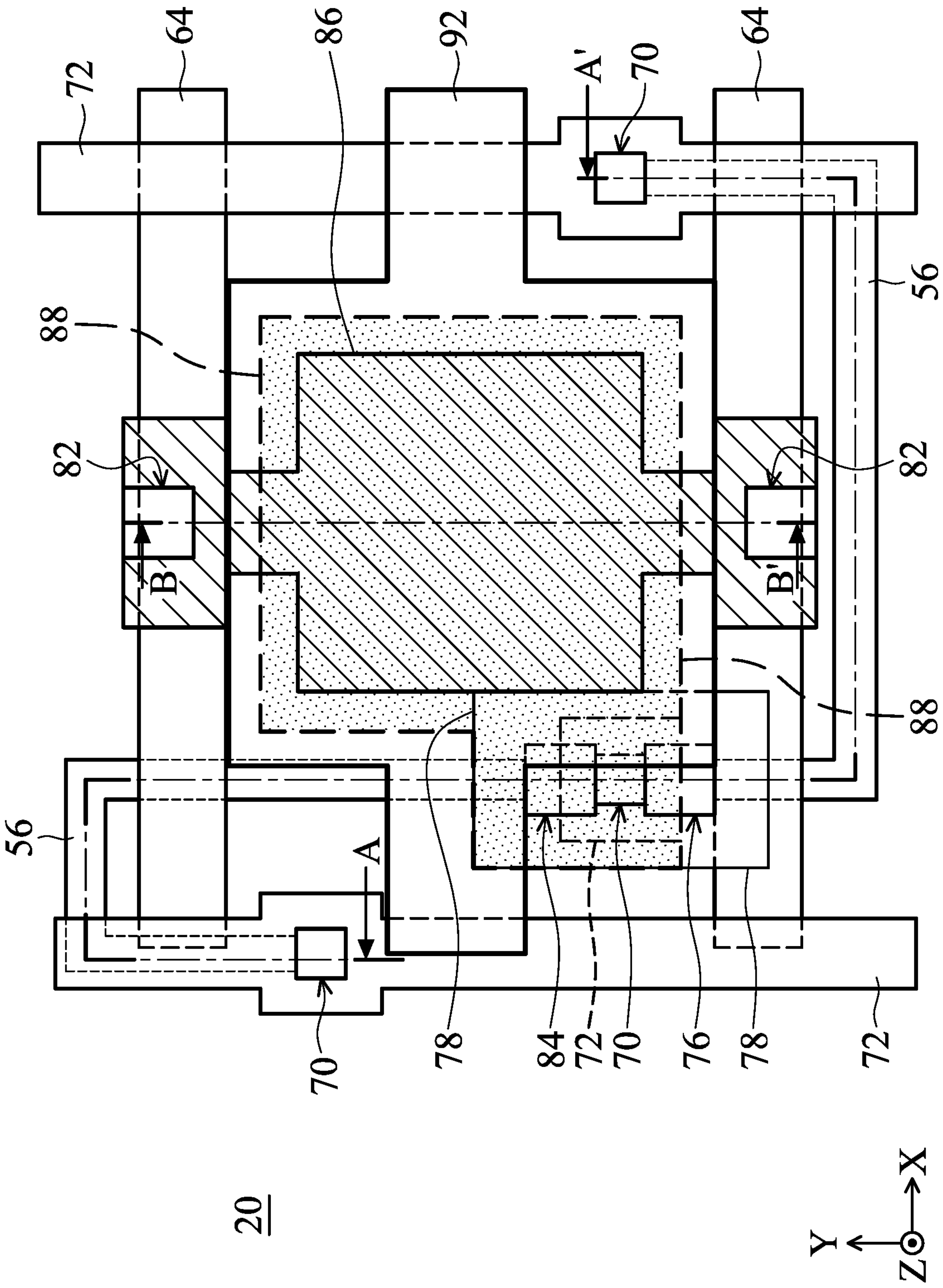
Figures 2, 3:
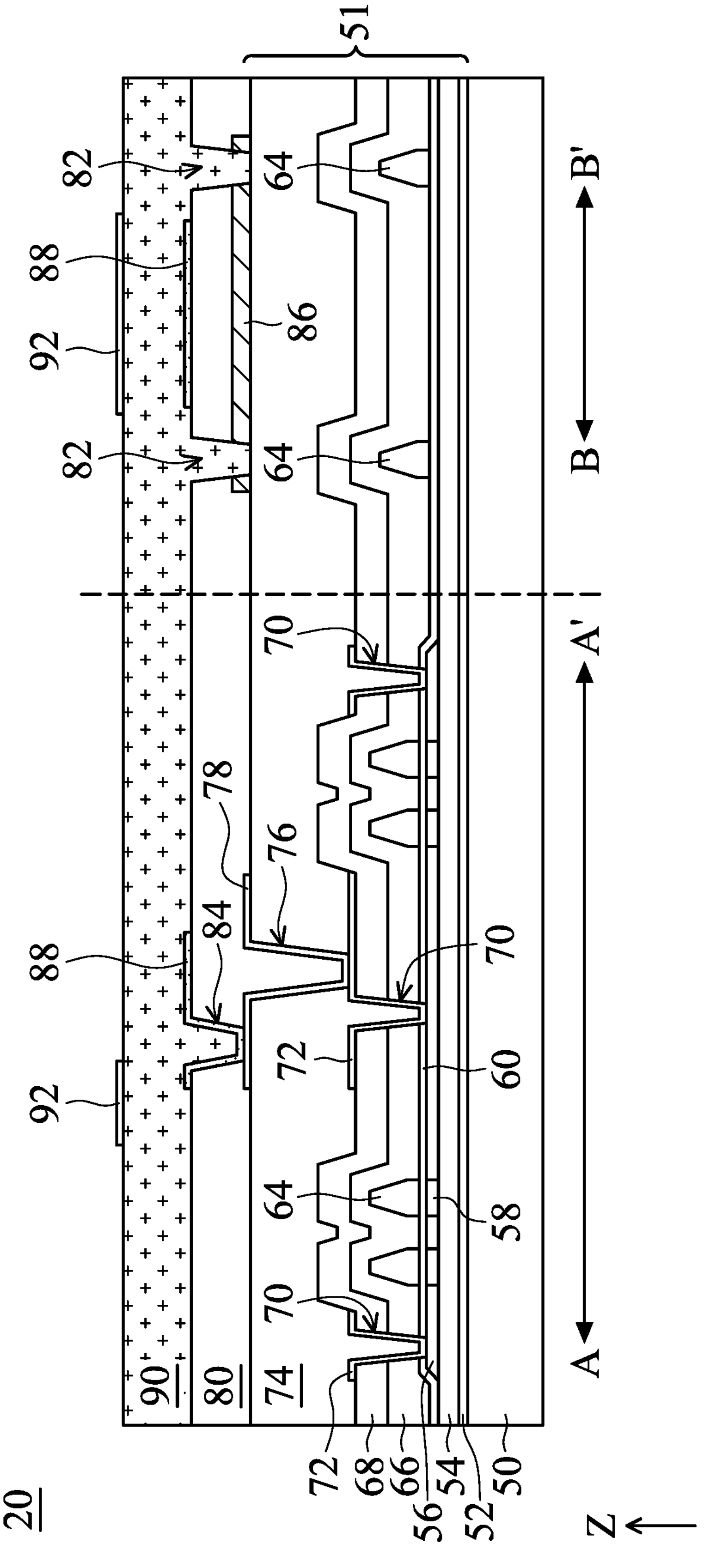
Figure 3:
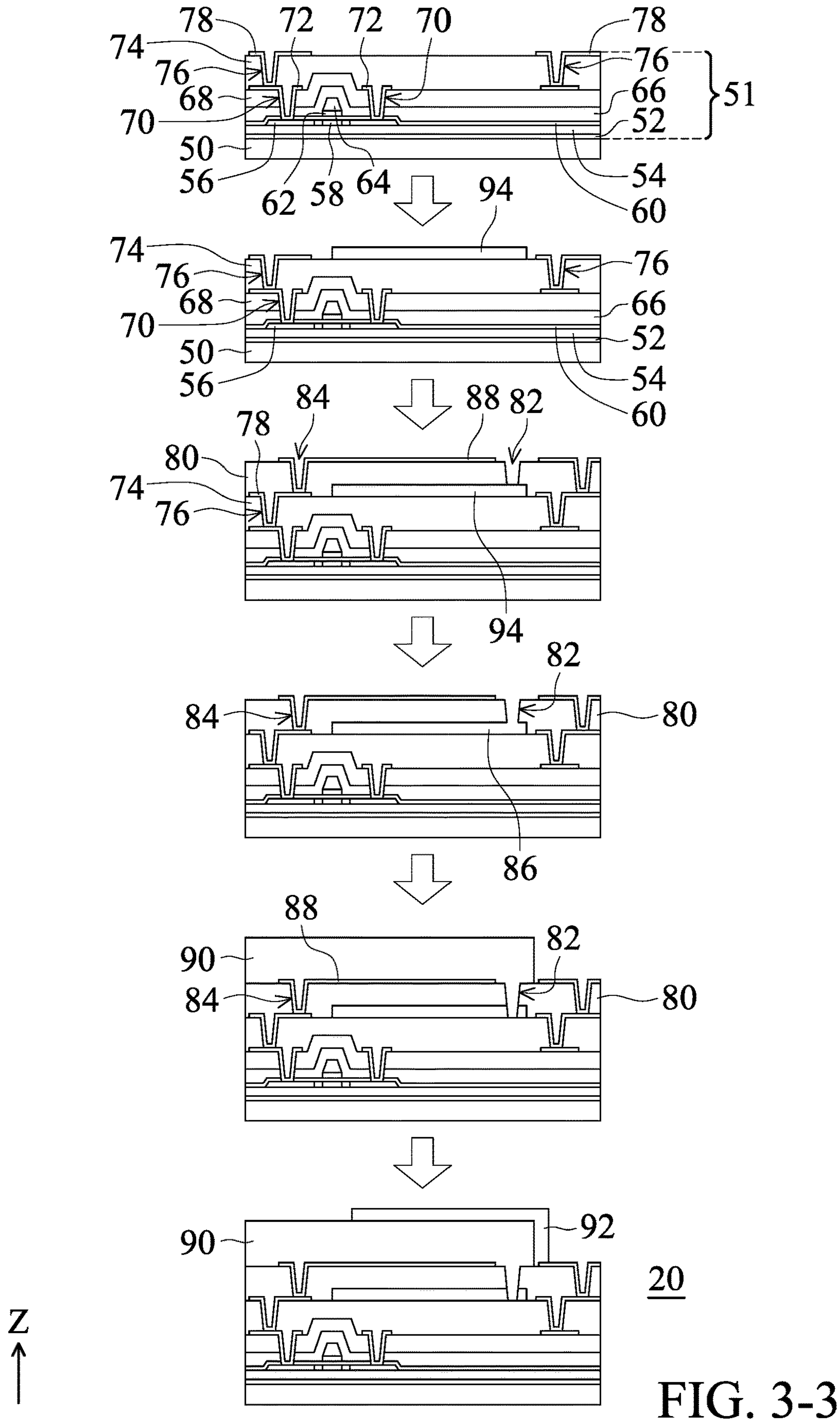

Referring to FIGS. 3-1 and 3-2, in accordance with one embodiment of the present disclosure, the detailed structure of the sonic transducer circuit unit 20 is further described. Here, a piezoelectric micromachined ultrasonic transducer (PMUT) is taken as an example for description. FIG. 3-1 is a top view of the sonic transducer circuit unit 20. FIG. 3-2 is a schematic cross-sectional view taken along the cross-sectional lines A-A' and B-B' of FIG. 3-1.

The sonic transducer circuit unit 20 is mainly composed of the sonic transducer 32 and the demultiplexer 34 (Referring to FIG. 2-1). As shown in FIGS. 3-1 and 3-2, the sonic transducer circuit unit 20 includes a substrate 50, an insulating layer 52, an insulating layer 54, a semiconductor layer 56, an insulating layer 60, a conductive layer 64, an insulating layer 66, an insulating layer 68, a conductive layer 72, an insulating layer 74, a conductive layer 78, an insulating layer 80, a cavity 86, a lower electrode 88, a piezoelectric layer 90, and an upper electrode 92. In the embodiment, the substrate 50 may have a supporting function. The insulating layer 52 is formed on the substrate 50. The insulating layer 54 is formed on the insulating layer 52. The semiconductor layer 56 is formed on the insulating layer 54 and includes the channel region 58 corresponding to the conductive layer 64. In the embodiment, the insulating layers (52 and 54) are located between the substrate 50 and the semiconductor layer 56, and have a buffer function. The insulating layer 60 is formed on the insulating layer 54 and covers the semiconductor layer 56. The conductive layer 64 is formed on the insulating layer 60. The insulating layer 60 is located between the semiconductor layer 56 and the conductive layer 64, for example, can be used as a gate insulating layer. The insulating layer 66 is formed on the insulating layer 60 and covers the conductive layer 64. The insulating layer 68 is formed on the insulating layer 66. The through hole 70 penetrates the insulating layers (60, 66 and 68), exposing the semiconductor layer 56. In the embodiment, the through hole 70 passes through the insulating layers (60, 66 and 68), which means that the insulating layers (60, 66 and 68) have the through hole 70, and other related embodiments are applicable, and will not be repeated. In some embodiments, the insulating layers (66 and 68) can be selectively arranged. The conductive layer 72 is formed on the insulating layer 68, fills the through hole 70, and is in contact with the semiconductor layer 56. The insulating layer 74 is formed on the insulating layer 68 to cover the conductive layer 72 and fills the through hole 70. In the embodiment, the insulating layer 74 has a flattening function, which enables the post-process components to be arranged on a flatter surface. The through hole 76 penetrates the insulating layer 74 to expose the conductive layer 72. The conductive layer 78 is formed on the insulating layer 74, fills the through hole 76, and is in contact with the conductive layer 72. So far, the active transistor structure in the demultiplexer 34 is formed. The above-mentioned transistor structure is any one of the transistors in the demultiplexer 34, such as the transistor 36*a* or the transistor 36*b* (as shown in FIG. 2-1).

The insulating layer 80 is formed on the insulating layer 74, covers the conductive layer 78, and fills the through holes 76. The through hole 82 penetrates the insulating layer 80 to expose the insulating layer 74. The through hole 84 penetrates the insulating layer 80 to expose the conductive layer 78. The cavity 86 is formed in the insulating layer 80 between the insulating layer 74 and the insulating layer 80. Referring to the subsequent process steps in FIG. 3-3, the formation of the cavity 86 is illustrated. The lower electrode 88 is formed on the insulating layer 80, fills the through hole 84, and is in contact with the conductive layer 78. The piezoelectric layer 90 is formed on the insulating layer 80 to cover the lower electrode 88 and fill the through hole 84. The upper electrode 92 is formed on the piezoelectric layer 90. So far, the piezoelectric micromachined ultrasonic transducer (PMUT) 32 is formed (as shown in FIG. 2-1).

In the embodiment, the thickness of the piezoelectric layer 90 may be 1-1.5 μm, such as 1.2 μm. The height of the cavity 86 may be 0.3-1 μm, such as 0.5 μm. The thickness of the insulating layer 80 may be 1.5-3 μm, such as 2 μm. The thickness of the upper electrode 92 may be 800-900 Å, such as 850 Å. The thickness of the insulating layer 74 may be 2-3 μm, such as 2.9 μm. The thickness of the insulating layer 66 and the insulating layer 68 may be 1,300-4,000 Å, such as 1,500 Å and 3,900 Å, respectively. The thickness of the insulating layer 60 may be between 650 Å and 450 Å, such as 700 Å or 450 Å. The thickness of the insulating layer 52 and the insulating layer 54 may be between 450 Å and 1,400 Å, such as 500 Å and 1,300 Å, respectively, but is not limited thereto.

In some embodiments, the piezoelectric layer 90 may include aluminum nitride, zinc oxide, or ceramic materials, or other suitable materials or a combination of the above materials, but is not limited thereto.

In some embodiments, the insulating layer 80 may be a single-layer or multi-layer insulating layer.

The material of the insulating layer may include, but is not limited to, inorganic materials such as silicon oxide, silicon nitride, silicon oxynitride, aluminum oxide or hafnium oxide, and may also include, but is not limited to, acrylic resin, or other appropriate materials or a combination of the above materials, but is not limited thereto. The insulating layer may be a single-layer structure or a multi-layer structure, but does not limit the scope of the present disclosure. In some embodiments, the insulating layers (for example, 52, 54, 60, 66 and 68) may include silicon oxide, silicon nitride or silicon oxynitride.

The substrate 50 may be a rigid substrate or a flexible substrate. The substrate 50 may include a single-layer material structure or a multi-layer material structure. The substrate 50 may be made of polyimide (PI), polyethylene terephthalate (PET), polycarbonate (PC), polyether sulfide (PES), polybutylene terephthalate (PBT), polyethylene naphthalate (PEN), polyarylate (PAR), or other appropriate materials or a combination of the above materials, but is not limited thereto.

The material of the semiconductor layer 56 may include, but is not limited to, amorphous silicon, polysilicon, germanium, compound semiconductors (such as gallium nitride, silicon carbide, gallium arsenide, gallium phosphide, indium phosphide, indium arsenide and/or indium antimonide), alloy semiconductors (for example, SiGe alloy, GaAsP alloy, AlInAs alloy, AlGaAs alloy, GaInAs alloy, GaInP alloy, GaInAsP alloy), or a combination of the above materials. The material of the semiconductor layer 56 may also include, but is not limited to, metal oxides (such as indium gallium zinc oxide (IGZO), indium zinc oxide (IZO), indium gallium zinc tin oxide (IGZTO)), or organic semiconductors containing polycyclic aromatic compounds, or a combination of the above materials. In some embodiments, the semiconductor layer 56 may be doped with p-type or n-type dopants.

In some embodiments, the lower electrode 88 may include a conductive layer of non-transparent material. In some embodiments, the upper electrode 92 may include a conductive layer of non-transparent material, and the selected material may be adjusted based on the conductivity and adhesion with the piezoelectric layer 90.

The material of the conductive layers (64, 72 and 78) may include, but is not limited to, opaque conductive materials, such as a single-layer or multi-layer composite structure composed of metal, metal oxide or other suitable conductive materials. For example, the conductive layers (64, 72 and 78) may respectively include at least one of aluminum, copper, silver, chromium, titanium and molybdenum, a composite layer of the foregoing materials, or an alloy of the foregoing materials. The conductive layers (64, 72 and 78) may include, but is not limited to, transparent conductive materials, such as transparent conducting oxide (TCO), indium tin oxide (ITO) or indium doped zinc oxide (IZO). The conductive layers (64, 72 and 78) may include, but is not limited to, a semi-transparent metal film material, such as a magnesium-silver alloy film, a gold film, a platinum film or an aluminum film, etc., or other suitable materials or a combination of the foregoing materials, but is not limited thereto.

The material composition of each of the above components is applicable to the related components of the present disclosure, and will not be repeated hereafter.

Referring to FIG. 3-2, the operation of the piezoelectric micromachined ultrasonic transducer (PMUT) is illustrated. In the piezoelectric micromachined ultrasonic transducer (PMUT), the transmission and reception of the signals are mainly based on the piezoelectric characteristics of the piezoelectric layer. When a driving signal AC is transmitted to the upper electrode 92 of the sonic transducer, a reference signal DC is transmitted to the lower electrode 88 of the sonic transducer at the same time. At this time, a vertical electric field is formed between the upper electrode 92 and the lower electrode 88. With the switching of the positive and negative voltages of the AC signal, the direction of the electric field continues to change, and the piezoelectric layer 90 deforms due to the piezoelectric properties of the material itself, releasing mechanical force. At this time, the insulating layer 80 vibrates due to the mechanical force, and then sends a sonic-wave signal to the object to be measured.

Referring to FIG. 3-3, in accordance with one embodiment of the present disclosure, a method for fabricating a sonic transducer circuit unit is provided. Here, a piezoelectric micromachined ultrasonic transducer (PMUT) is taken as an example for description. FIG. 3-3 is a schematic cross-sectional view of the method for fabricating the sonic transducer circuit unit.

First, a substrate 50 is provided, and a driving layer 51 is formed on the substrate 50. The driving layer 51 includes a stack of an insulating layer 52 to a conductive layer 78. Next, a sacrificial layer 94 is formed on the driving layer 51. In the embodiment, the sacrificial layer 94 is formed on an insulating layer 74. Next, an insulating layer 80 is formed on the insulating layer 74 to cover the conductive layer 78 and the sacrificial layer 94, and fills through holes 76. Next, the insulating layer 80 is etched to form a through hole 82 corresponding to the sacrificial layer 94 and a through hole 84 corresponding to the conductive layer 78. The through hole 82 penetrates the insulating layer 80, and the sacrificial layer 94 is exposed. The through hole 84 penetrates the insulating layer 80, and the conductive layer 78 is exposed. Next, a lower electrode 88 is formed on the insulating layer 80, fills the through hole 84, and is in contact with the conductive layer 78. Next, the sacrificial layer 94 is removed, and a cavity 86 is formed. In some embodiments, the sacrificial layer 94 may be removed by an etching process, for example, providing an etching solution to enter the through hole 82 to remove the sacrificial layer 94 by etching. In some embodiments, the sacrificial layer 94 may also be removed by introducing an etching gas, but the present disclosure is not limited thereto. Next, a piezoelectric layer 90 is formed on the insulating layer 80 to cover the lower electrode 88, and fills the through holes (82 and 84). In some embodiments, the piezoelectric layer 90 may be formed on the insulating layer 80 by a sputtering process. Next, an upper electrode 92 is formed on the piezoelectric layer 90 so that the piezoelectric layer 90 is located between the upper electrode 92 and the lower electrode 80. So far, the fabrication of the sonic transducer circuit unit 20 is completed.

In the embodiments of the present disclosure, the driving layer 51 is completed before the cavity 86 is formed. In more detail, the driving layer 51 includes a stack of layers before the sacrificial layer 94 is formed.

Figures 1, 4:
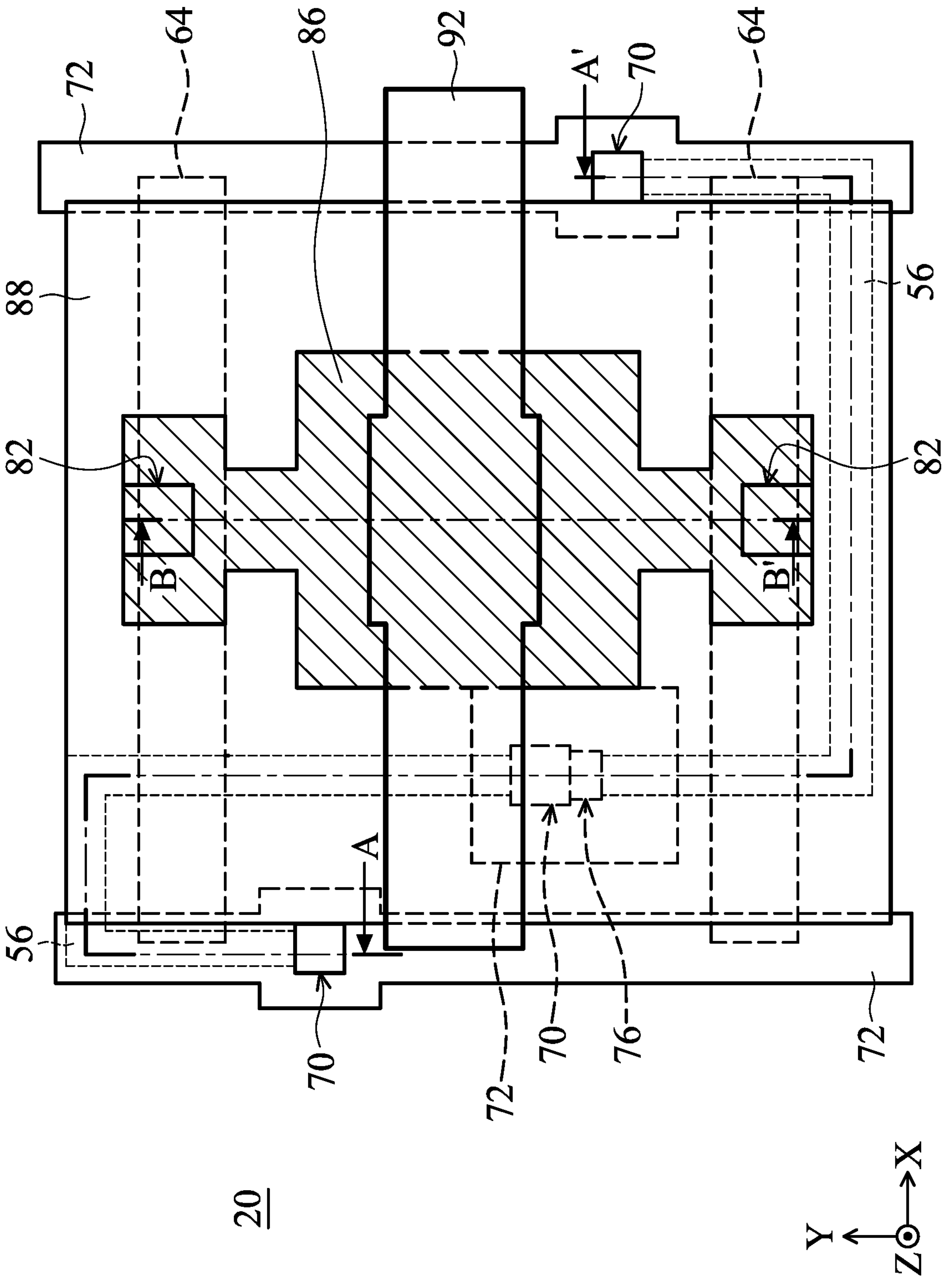
Figures 2, 4:
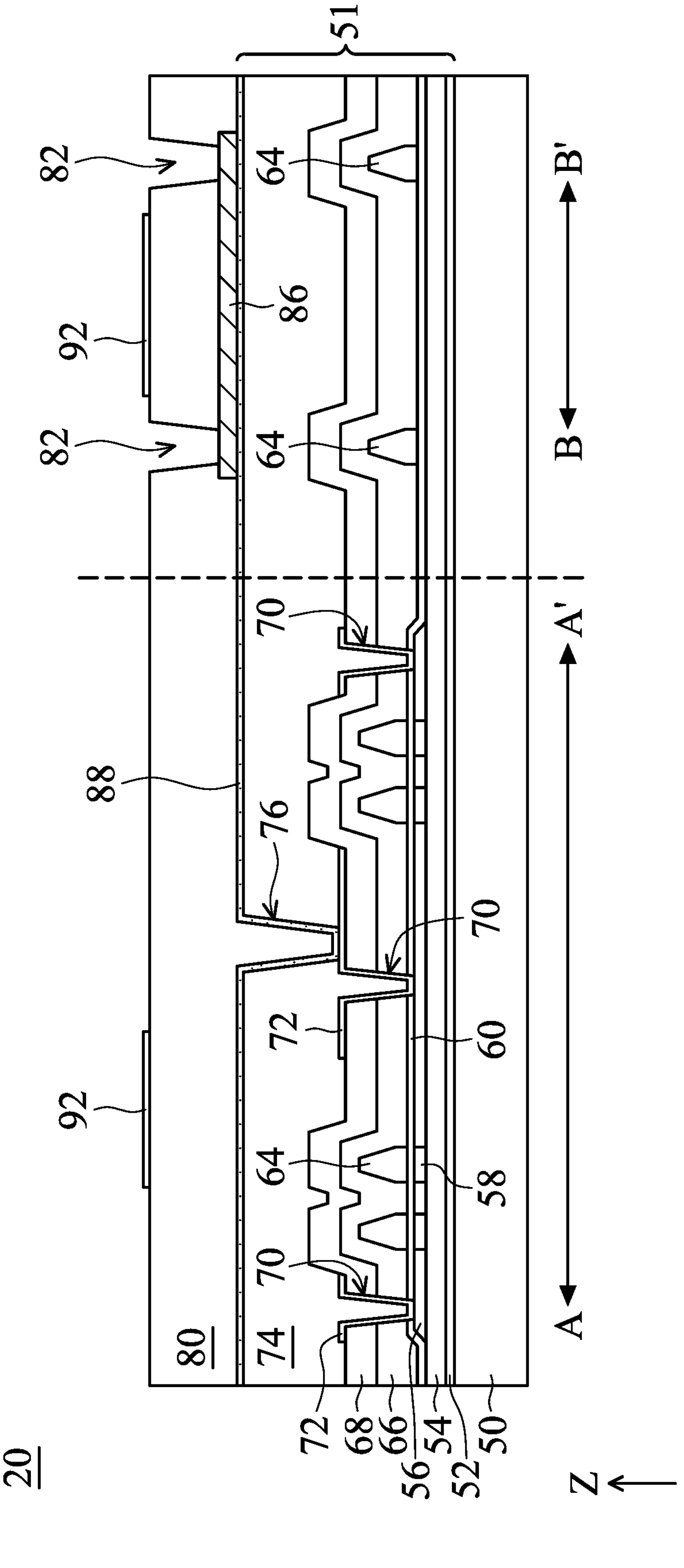
Figures 3, 4:
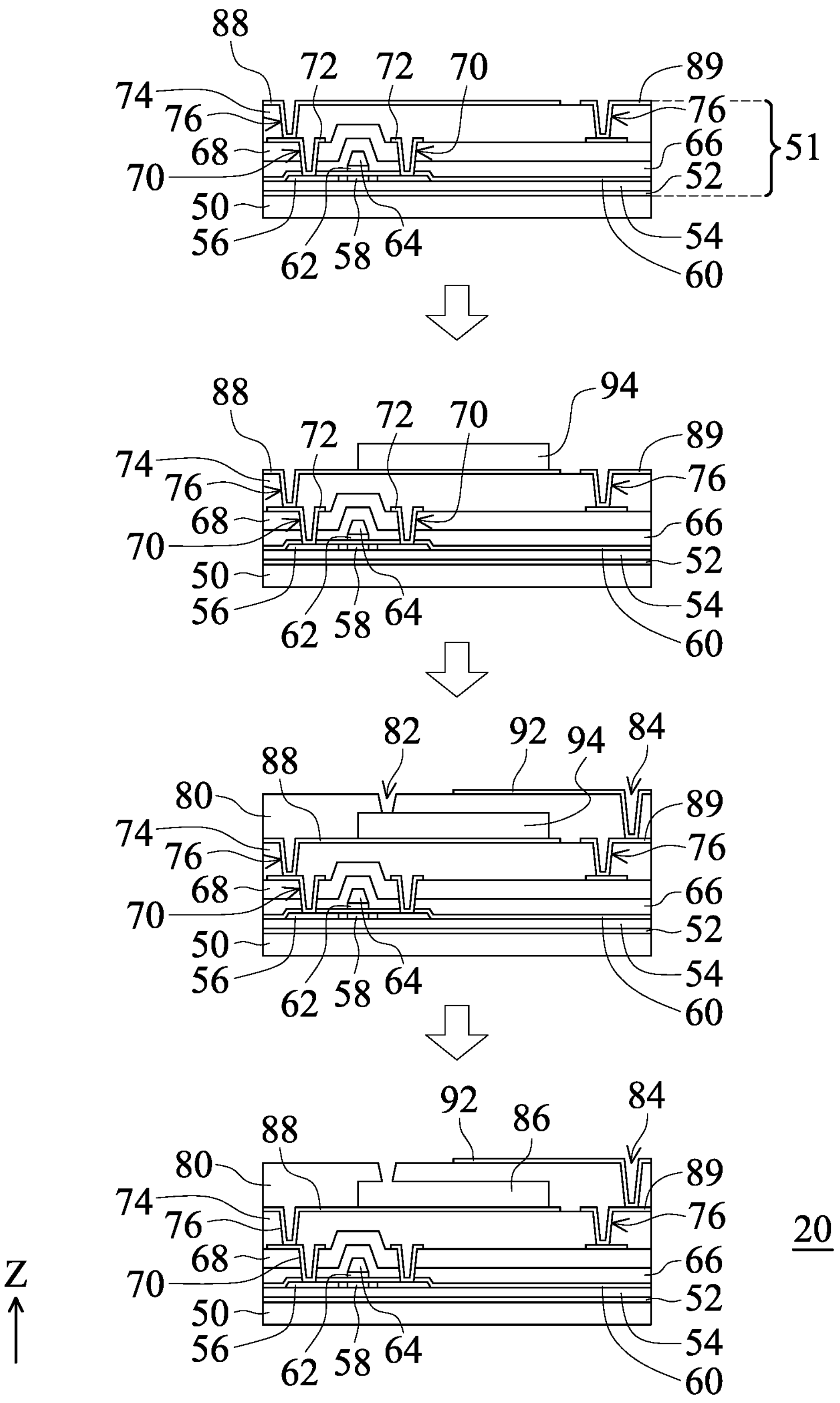
Figures 2, 3, 4:
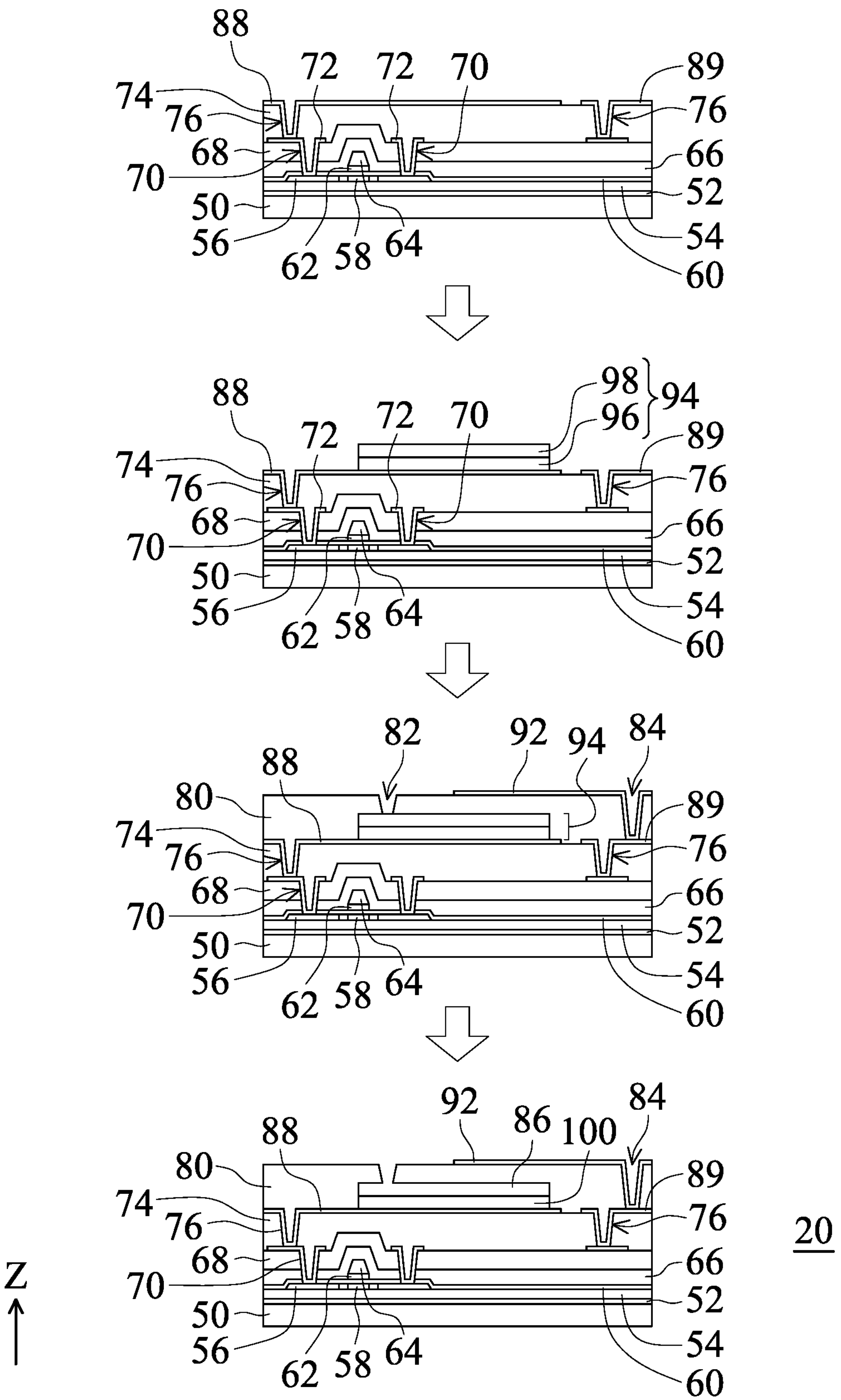

Referring to FIGS. 4-1 and 4-2, in accordance with one embodiment of the present disclosure, the detailed structure of the sonic transducer circuit unit 20 is further described. Here, a capacitive micromachined ultrasonic transducer (CMUT) is taken as an example for description. FIG. 4-1 is a top view of the sonic transducer circuit unit 20. FIG. 4-2 is a schematic cross-sectional view taken along the cross-sectional lines A-A' and B-B' of FIG. 4-1.

The sonic transducer circuit unit 20 is mainly composed of the sonic transducer 32 and the demultiplexer 34 (Referring to FIG. 2-1). As shown in FIGS. 4-1 and 4-2, the sonic transducer circuit unit 20 includes a substrate 50, an insulating layer 52, an insulating layer 54, a semiconductor layer 56, a channel region 58, an insulating layer 60, a conductive layer 64, an insulating layer 66, an insulating layer 68, a through hole 70, a conductive layer 72, an insulating layer 74, a through hole 76, a lower electrode 88, an insulating layer 80, a through hole 82, a cavity 86, and an upper electrode 92. In the embodiment, the substrate 50 may have a supporting function. The insulating layer 52 is formed on the substrate 50. The insulating layer 54 is formed on the insulating layer 52. The semiconductor layer 56 is formed on the insulating layer 54 and includes the channel region 58. In the embodiment, the insulating layers (52 and 54) are located between the substrate 50 and the semiconductor layer 56, and have a buffer function. The insulating layer 60 is formed on the insulating layer 54 and covers the semiconductor layer 56. The conductive layer 64 is formed on the insulating layer 60. The insulating layer 60 is located between the semiconductor layer 56 and the conductive layer 64, for example, can be used as a gate insulating layer. The insulating layer 66 is formed on the insulating layer 60 and covers the conductive layer 64. The insulating layer 68 is formed on the insulating layer 66. The through hole 70 penetrates the insulating layers (60, 66 and 68), exposing the semiconductor layer 56. The conductive layer 72 is formed on the insulating layer 68, fills the through hole 70, and is in contact with the semiconductor layer 56. The insulating layer 74 is formed on the insulating layer 68 to cover the conductive layer 72 and fills the through hole 70. The insulating layer 74 has a flattening function, which enables the post-process components to be arranged on a flatter surface. The through hole 76 penetrates the insulating layer 74 to expose the conductive layer 72. The lower electrode 88 is formed on the insulating layer 74, fills the through hole 76, and is in contact with the conductive layer 72. In some embodiments, the lower electrode 88 may include a conductive layer of non-transparent material. So far, the transistor structure in the demultiplexer 34 is formed. The above-mentioned transistor structure is any one of the transistors in the demultiplexer 34, such as the transistor 36*a* or the transistor 36*b* (as shown in FIG. 2-1).

The insulating layer 80 is formed on the lower electrode 88 and fills the through hole 76. The through hole 82 penetrates the insulating layer 80 to expose the lower electrode 88. The upper electrode 92 is formed on the insulating layer 80. The cavity 86 is formed in the insulating layer 80 between the lower electrode 88 and the upper electrode 92. So far, the capacitive micromachined ultrasonic transducer (CMUT) 32 is formed (as shown in FIG. 2-1).

In the embodiments of the present disclosure, in the piezoelectric micromachined ultrasonic transducer (PMUT), the transmission and reception of the signals are based on the piezoelectric characteristics of the piezoelectric layer. During the continuous change of the electric field, the piezoelectric layer deforms due to the piezoelectric properties of the material itself, releasing mechanical force, causing the insulating layer to vibrate due to the mechanical force, and then sending out sonic-wave signals to the object to be measured. In the capacitive micromachined ultrasonic transducer (CMUT), the transmission and reception of the signals are based on the principle of the attraction of positive and negative charges between the upper and lower electrodes. When the upper and lower electrodes are attracted by electrostatic force to produce displacement, the insulating layer vibrates due to the force, and then sends out sonic-wave signals to the object to be measured.

Referring to FIG. 4-2, the operation of the capacitive micromachined ultrasonic transducer (CMUT) is illustrated. In the capacitive micromachined ultrasonic transducer (CMUT), the transmission and reception of the signals are mainly based on the principle of the attraction of positive and negative charges between the upper and lower electrodes. When a driving signal AC is transmitted to the upper electrode 92 of the sonic transducer, a reference signal DC is transmitted to the lower electrode 88 of the sonic transducer at the same time. With the switching of the positive and negative voltages of the AC signal, the upper electrode moves towards the lower electrode due to the electrostatic force between the upper electrode and the lower electrode. During the displacement of the upper electrode, the insulating layer 80 vibrates due to the force, and then sends out sonic-wave signals to the object to be measured.

Referring to FIG. 4-3, in accordance with one embodiment of the present disclosure, a method for fabricating a sonic transducer circuit unit is provided. Here, a capacitive micromachined ultrasonic transducer (CMUT) is taken as an example for description. FIG. 4-3 is a schematic cross-sectional view of the method for fabricating the sonic transducer circuit unit.

First, a substrate 50 is provided, and a driving layer 51 is formed on the substrate 50. The driving layer 51 includes a stack of an insulating layer 52 to a lower electrode 88 and a conductive layer 89. Next, a sacrificial layer 94 is formed on the driving layer 51. In the embodiment, the sacrificial layer 94 is formed on the lower electrode 88. Next, an insulating layer 80 is formed on the insulating layer 74 to cover the lower electrode 88, the sacrificial layer 94 and the conductive layer 89, and fills through holes 76. In the embodiment, the lower electrode 88 and the conductive layer 89 may be formed through a single process, or may be formed separately, but is not limited thereto. Next, the insulating layer 80 is etched to form a through hole 82 corresponding to the sacrificial layer 94 and a through hole 84 corresponding to the conductive layer 89. The through hole 82 penetrates the insulating layer 80, and the sacrificial layer 94 is exposed. The through hole 84 penetrates the insulating layer 80, and the conductive layer 89 is exposed. Next, an upper electrode 92 is formed on the insulating layer 80, fills the through hole 84, and is in contact with the conductive layer 89. Next, the sacrificial layer 94 is removed, and a cavity 86 is formed. The cavity 86 is located between the upper electrode 92 and the lower electrode 88. In some embodiments, the sacrificial layer 94 may be removed by an etching process, for example, providing an etching solution to enter the through hole 82 to remove the sacrificial layer 94 by etching. In some embodiments, the sacrificial layer 94 may also be removed by introducing an etching gas, but the present disclosure is not limited thereto. So far, the fabrication of the sonic transducer circuit unit 20 is completed.

Referring to FIG. 4-3-2, in accordance with one embodiment of the present disclosure, a method for fabricating a sonic transducer circuit unit is provided. Here, a capacitive micromachined ultrasonic transducer (CMUT) is taken as an example for description. FIG. 4-3-2 is a schematic cross-sectional view of the method for fabricating the sonic transducer circuit unit.

First, a substrate 50 is provided, and a driving layer 51 is formed on the substrate 50. Next, a sacrificial layer 94 is formed on a lower electrode 88. The sacrificial layer 94 may include a double-layer structure formed by stacking an amorphous silicon layer 96 and a nickel layer 98, but the present disclosure is not limited thereto, and other specific material combinations are also applicable to the present disclosure. For example, a double-layer structure formed by stacking an amorphous silicon layer and an aluminum layer. Next, an insulating layer 80 is formed on an insulating layer 74 to cover the lower electrode 88, the sacrificial layer 94 and a conductive layer 89, and fills through holes 76. Next, the insulating layer 80 is etched to form a through hole 82 corresponding to the sacrificial layer 94 and a through hole 84 corresponding to the conductive layer 89. The through hole 82 penetrates the insulating layer 80, and the sacrificial layer 94 is exposed. The through hole 84 penetrates the insulating layer 80, and the conductive layer 89 is exposed. Next, an upper electrode 92 is formed on the insulating layer 80, fills the through hole 84, and is in contact with the conductive layer 89. Next, an annealing process is performed to form a cavity 86. During the annealing process, a eutectic reaction takes place between the amorphous silicon layer 96 and the nickel layer 98: That is, nickel atoms are dissolved and diffuse into the amorphous silicon layer, and a new nickel silicide layer 100 is formed on the lower electrode 88. Due to the volume change of the amorphous silicon layer 96 and the nickel layer 98 during the eutectic process, the cavity 86 is formed. So far, the fabrication of the sonic transducer circuit unit 20 is completed.

In the present disclosure, micromachined ultrasonic transducer (MUT) components are fabricated directly on a substrate containing a transistor structure, and the MUT is implemented by an active matrix. The system includes a pixel array, which is composed of single pixels, and a single pixel is composed of two transistors and one MUT component. In the present disclosure, the pixels that perform reception/transmission of signals can be controlled by a driving circuit. The MUT may include piezoelectric micromachined ultrasonic transducer (PMUT) or capacitive micromachined ultrasonic transducer (CMUT). The PMUT component includes a piezoelectric layer, a cavity, and upper and lower electrodes respectively arranged above and below the piezoelectric layer. The CMUT component includes a cavity and upper and lower electrodes respectively arranged above and below the cavity. The cavity in the MUT component may also be formed by the volume change caused by the eutectic reaction between the conductive layers. In addition, in the present disclosure, the MUT component is fabricated on a substrate containing a transistor structure, which is liable to achieve large-area fabrication and greatly reduces costs. The present disclosure can be widely used in, for example, distance detection, fingerprint biometric sensors, gesture detection, ultrasonic imaging or biochemical sensors, etc.

Although some embodiments of the present disclosure and their advantages have been described in detail, it should be understood that various changes, substitutions and alterations can be made herein without departing from the spirit and scope of the disclosure as defined by the appended claims. The features of the various embodiments can be used in any combination as long as they do not depart from the spirit and scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods or steps. In addition, each claim constitutes an individual embodiment, and the claimed scope of the present disclosure includes the combinations of the claims and embodiments. The scope of protection of present disclosure is subject to the definition of the scope of the appended claims. Any embodiment or claim of the present disclosure does not need to meet all the purposes, advantages, and features disclosed in the present disclosure.

What is claimed is:

1. An electronic device, comprising:

a plurality of transducer pixels, each transducer pixel comprises:

a sonic transducer;

a first demultiplexer electrically connected to the sonic transducer;

a driving line electrically connected to the sonic transducer;

a switching line electrically connected to the first demultiplexer;

a reading line electrically connected to the first demultiplexer, wherein the driving line is used to provide a driving signal to the sonic transducer to emit sonic waves, and the switching line is used to turn on the first demultiplexer to output a sensing signal received by the sonic transducer to the reading line; and a driving circuit electrically connected to a second demultiplexer, wherein the second demultiplexer comprises at least two transistors having source electrodes used to receive a driving signal and a reference signal respectively.

2. The electronic device as claimed in claim 1, wherein the first demultiplexer comprises at least two transistors having gate electrodes, and the switching line comprises two branch lines electrically connected to the gate electrodes of the at least two transistors.

3. The electronic device as claimed in claim 1, wherein the sonic transducer comprises a piezoelectric micromachined ultrasonic transducer (PMUT).

4. The electronic device as claimed in claim 3, wherein the PMUT comprises a lower electrode, a piezoelectric layer and an upper electrode, and the piezoelectric layer is between the upper electrode and the lower electrode.

5. The electronic device as claimed in claim 4, further comprising a cavity in an insulating layer below the lower electrode.

6. The electronic device as claimed in claim 1, wherein the sonic transducer comprises a capacitive micromachined ultrasonic transducer (CMUT).

7. The electronic device as claimed in claim 6, wherein the CMUT comprises a lower electrode, an insulating layer, a cavity and an upper electrode, and the cavity is in the insulating layer between the lower electrode and the upper electrode.

* * * * *